United States Patent [19]

De Cesare

[11] Patent Number: 4,883,997
[45] Date of Patent: Nov. 28, 1989

[54] TWO POLE ELECTRIC MOTOR CONSTRUCTIONS WITH STATOR WINDING ENCIRCLING THE ROTOR AND METHOD OF ASSEMBLING SAME

[76] Inventor: Dominic De Cesare, 223 Center St., Elizabeth, N.J. 07202

[21] Appl. No.: 173,444

[22] Filed: Mar. 25, 1988

Related U.S. Application Data

[63] Continuation-in-part of Ser. No. 890,134, Jul. 28, 1986.

[51] Int. Cl.$^4$ .............................................. H02K 1/00
[52] U.S. Cl. ..................................... 310/179; 310/42; 310/91; 310/216; 310/254; 310/259; 310/261; 336/221
[58] Field of Search .................. 310/42, 254, 255, 256, 310/257, 258, 259, 91, 216, 218, 162, 208, 261, 172, 179, 180, 194, 40 MM; 318/750; 29/596; 336/221

[56] References Cited

U.S. PATENT DOCUMENTS

| | | | |
|---|---|---|---|
| 1,917,289 | 7/1933 | Benson | 310/172 |
| 2,027,846 | 1/1936 | Suits | 318/750 |
| 2,066,760 | 1/1937 | Blamberg | 318/750 |
| 2,071,224 | 2/1937 | Ballentine | 310/172 |
| 2,253,524 | 8/1941 | Lilja | 318/750 |
| 2,567,976 | 9/1951 | Spinasse | 318/750 |
| 4,482,832 | 11/1984 | Minton | 310/172 |

FOREIGN PATENT DOCUMENTS

| | | | |
|---|---|---|---|
| 2435574 | 2/1975 | Fed. Rep. of Germany | 310/218 |
| 2540743 | 4/1976 | Fed. Rep. of Germany | 310/254 |
| 3406906 | 9/1985 | Fed. Rep. of Germany | 310/254 |
| 6508309 | 12/1966 | Netherlands | 310/218 |

Primary Examiner—R. Skudy
Attorney, Agent, or Firm—Lilling & Greenspan

[57] ABSTRACT

A two-pole electric motor constructions are described which have stator winding encircling the rotor, and the method is described of assembling same. A main stator section is provided with coil bearing surfaces which receive rotor coils after the rotor has been inserted into the rotor receiving opening, the coils being moved into overlapping relationship with the rotor and limited in movement or aligned by a stop or limit projection between the coil bearing surfaces. The main stator sections are secured either by the use of U-shaped upper and lower yokes, or rectangular yoke sections to fix the positions of the stator coils, and the rotors are mounted for rotation but against axial movement by the means of suitable brackets or stand-off or spacing members.

8 Claims, 10 Drawing Sheets

TWO POLE ELECTRIC MOTOR CONSTRUCTIONS WITH STATOR WINDING ENCIRCLING THE ROTOR AND METHOD OF ASSEMBLING SAME

CROSS REFERENCE TO RELATED APPLICATION(S)

This application is a continuation-in-part application (CIP) of U.S. patent application Ser. No. 890,134, filed July 28, 1986.

BACKGROUND OF THE INVENTION

1. Field of the Invention

This invention generally relates to constructions of electric motors, and more specifically to motor constructions wherein the stator coils are arranged to maximize the flux coupled into the rotor space or air gap and, therefore, the rotor and which facilitate assembly.

2. Description of Related Art

The efficient operation of a motor relies upon effective coupling of magnetic flux or field developed in the stator poles into the rotor air gap or space and, therefore, the rotor. However, in most electrical machines there is considerable fringe or leakage flux which bypasses the rotor space, and, therefore, is not coupled to the rotor. This occurs because magnetic flux takes the path of least resistance in the magnetic circuit, or the path of lowest magnetic reluctance. Since the opposing poles in a two pole motor are in the shape of circular cylindrical surfaces, to accommodate the cylindrical rotor, the extreme portions of the opposing poles, which are the closest to each other, offer the path of least resistance to the magnetic flux and a significant portion of that flux bridges such portions of the opposing poles and, thereby, bypasses the rotor. This fringe or leakage flux serves no useful purpose and prevents the motor from achieving optimum operational or performance characteristics.

In U.S. Pat. No. 4,482,832, issued on Nov. 13, 1984, a shaded pole motor is disclosed which uses a lamination design which improves the geometry of the inter-pole gap. According to the patentee, this is intended to improve the operating efficiency of the motor. This is achieved in the patent by providing a reluctance gap having a base region of minimal cross-sectional area. This design recognizes the problem created by fringe or leakage flux. Since fabrication of the laminations is substantially simplified by providing a single continuous lamination which forms both opposing poles, the reduction of the cross-sectional area to the minimum possible dimension increases the magnetic reluctance of the smaller sections of magnetic material, this forcing a greater amount of the flux through the rotor air gap or space. The situation resembles an electrical circuit of parallel resistors. The rotor space or gap between the poles represents a reluctance to the magnetic field which is substantially greater than the reluctance presented by the magnetic material forming the laminations. By decreasing the amount of metal bridging or connecting the poles, the reluctance to the magnetic field continues to increase thereby forcing a greater and greater amount of the flux through the air gap or rotor space.

The foregoing U.S. Pat. No. 4,482,832 discloses a very common type of fractional horsepower AC shaded pole electric motor construction. In this type of motor, there is provided a stator core which is basically U-shaped, including two side portions or arms and a connecting or cross portion provided with the cylindrical opening for the rotor. The end portions of the arms are bridged by a yoke which supports the coil. Application of an AC signal to the coil in such a motor causes a magnetic intensity in the magnetic circuit with the resulting flux splitting into two components as aforementioned. The extent to which the flux will pass through the rotor space will be a function of the thickness of the magnetic material connecting or bridging the opposing pole faces. However, even if the metal were theoretically entirely removed, so that there was true physical separation of the opposing poles, there would still be a significant amount of leakage or flux because the regions where the opposing poles are the closest are at these diametrically opposite sides of the rotor and this, again, presents the lowest reluctance path or path of least resistance for the flux.

There have been numerous proposals for positioning stator coils on motors. One example of such motor is disclosed in U.S. Pat. No. 2,253,524. This patent discloses a reversible motor including a primary stator coil positioned on the yoke as discussed in connection with U.S. Pat. No. 4,482,832. However, additional stator coils are provided on or in the region of the cross or bridging portion of the stator core and positioned on opposing sides of the rotor air gap or space. These coils are connected in different electrical configurations designed to permit easy reversal of the direction or rotation of the motor. In essence, the reference discloses the creation of multiple poles spaced from each other with respect to the axial or medial plane of the rotor to permit the enhancement of flux in different portions of the rotor. However, the motor disclosed in U.S. Pat. No. 2,253,524 suffers the same disadvantages above discussed since substantial amounts of flux field are bypassed or shunted around the motor and, therefore, serves no effective or useful function.

Additional examples of reversible-type shaded pole motors are disclosed in the following U.S. Pat. Nos. 2,027,846; 2,066,760; and 2,567,976.

In my co-pending application Ser. No. 890,134, a two-pole electric motor is disclosed which has stator windings encircling the rotor. However, because the stator windings must at least partially encircle the rotor which is received within a central opening of the stator, special constructions must be used to facilitate assembly. A few such constructions are disclosed in the co-pending application.

SUMMARY OF THE INVENTION

It is a primary object of the present invention to provide constructions for a two-pole motor with stator windings encircling the rotor which are simple in construction and can be quickly and conveniently assembled.

In accordance with the invention, a main stator section is provided with a central cylindrical opening. A rotor is provided within said cylindrical opening mounted for rotation about a motor axis, said main stator section defining lateral stator portions on opposite sides of said cylindrical opening and generally flat top and bottom stator surfaces above and below said cylindrical opening. Each of said top and bottom stator surfaces include a central coil bearing surface generally coextensive with said cylindrical opening and yoke-abutting surfaces, on each side of said coil bearing surfaces, and generally coextensive with said lateral stator portions. Stator windings are provided which define an opening configured and dimensioned to extend over said lateral stator portions with clearance and moved into abutment against said coil bearing surfaces. Stop means is provided on said coil bearing surfaces for limiting movement of said stator coils from one side of the motor axis to the other side thereof while aligning said stator coils with the rotor in overlapping relationship therewith. Generally U-shaped upper yokes are provided each having a pair of lateral yoke arms and a transverse yoke portion, said U-shaped yokes being dimensioned to maintain said stator coils on said coil bearing surfaces in overlapping relationship with said rotor. Advantageously, each yoke bearing surface is provided with an elongate recess substantially parallel to the motor axis. Said lateral yoke arms include elongate projections which are configured to be received within associated recesses in press-fit relationship.

In accordance with another embodiment of the invention, a main stator section is provided with a central cylindrical opening. A rotor within said cylindrical opening is mounted for rotation about a motor axis, said main stator section defining lateral stator portions on opposite sides of said cylindrical opening and generally parallel top and bottom stator surfaces above and below said cylindrical opening. Each of said top and bottom stator surfaces include a central coil bearing surface generally coextensive with the cylindrical opening. Stator windings are provided which define an opening configured and dimensioned to extend over said lateral stator portions with clearance and moved into abutment against said coil bearing surfaces. Stop means is provided on said coil bearing surfaces for limiting movement of said stator coils from one side of the stator axis to the other side thereof while aligning said stator coils with the rotor in overlapping relationship therewith. A generally rectangular yoke is provided which defines lateral yoke arms provided with recesses for receiving said lateral stator portion and upper and lower yoke arms provided with recesses for receiving said stator coils and maintain same on said coil bearing surfaces in overlapping relationship with said rotor.

The invention also relates to the method of assembling the motor construction in accordance with the invention.

BRIEF DESCRIPTION OF THE DRAWINGS

The invention will now be described in further detail with regard to preferred embodiments as illustrated in the accompanying drawings, in which.

DESCRIPTION OF THE PREFERRED EMBODIMENTS

Figure 1:
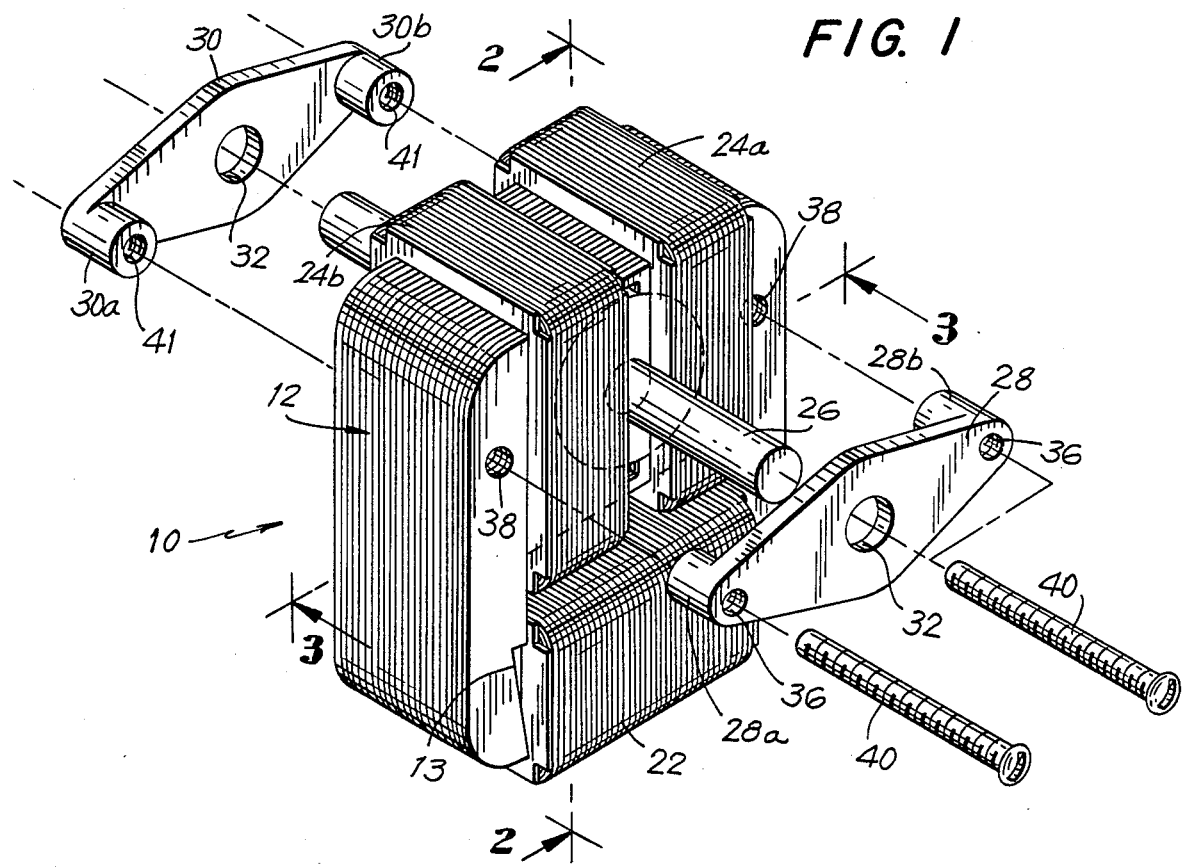
FIG. 1 is an exploded view in perspective of one presently preferred embodiment of the invention, as showing a two pole AC shaded pole motor with one conventional, primary and two secondary or auxiliary rotor encircling coil windings over the rotor space; one on each side of the rotor shaft.
Figure 2:
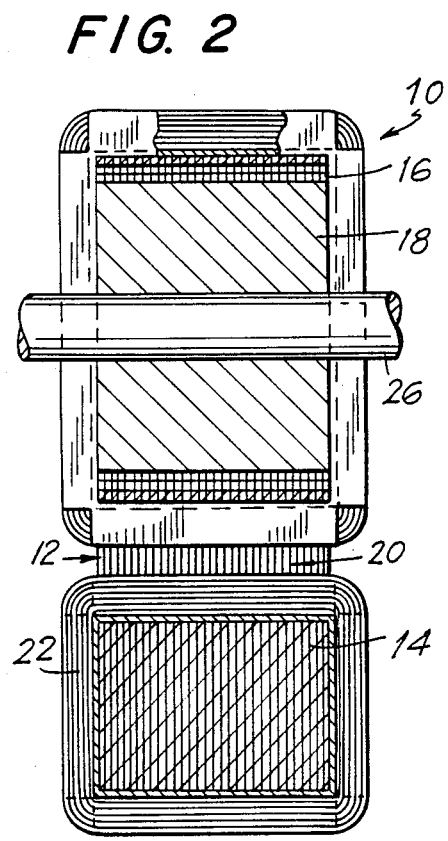
FIG. 2 is an enlarged cross-sectional view of the motor shown in FIG. 1, taken along line 2—2.
Figure 3:
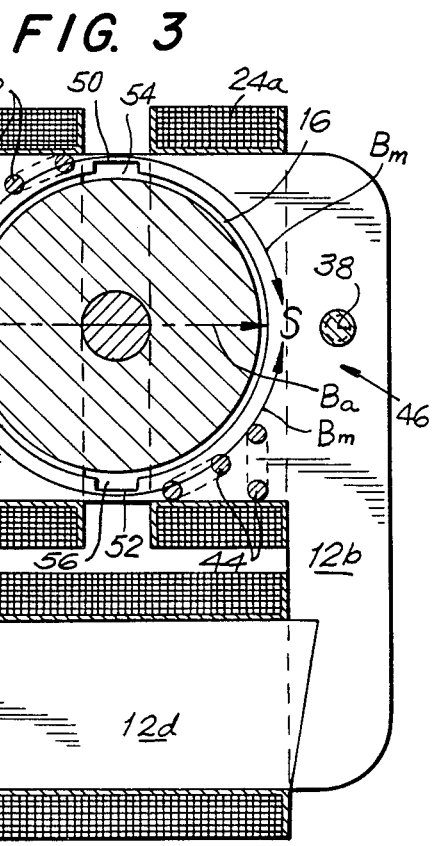
FIG. 3 is an enlarged cross-sectional view of the motor as shown in FIG. 1, taken along lines 3—3.

Referring now specifically to the figures, in which identical or similar parts are designated by the same reference numeral throughout, and first referring to FIGS. 1-3, there is illustrated a first embodiment of fractional horse power AC shaded pole electric motor generally designated by the reference numeral 10.

The basic construction of the motor 10 is similar to the shaded pole motor disclosed in U.S. Pat. No. 4,482,832.

The motor 10 includes stator core 12 formed of a series of stacked laminations 14 having the same geometry and made of a magnetically permeable material of the type well known to those skilled in the art. The laminations are generally rectangular in configuration and include a generally U-shaped member consisting of two lateral or side portions or arms 12a, 12b connected by a bridging or cross portion 12c. At their free ends, the arms 12a, 12b are joined by a yoke 12d in any conventional manner, such as being press-fitted by the use of a dove tail configuration at cutting lines 13 in FIG. 3.

The bridging or cross portion 12c of the stator core 12 is provided with a circular cylindrical opening or rotor space 16, the axis of which is normal to the planes of the laminations 14 for receiving therein a rotor 18 with a small clearance or air gap 19. The cylindrical opening 16, therefore, forms a rotor air gap or space in which the rotor 18 is conventionally mounted for rotation. The laminations are also provided with cut outs which produce a generally rectangular opening 20 which accommodates at least a portion of the primary or yoke winding 22 mounted on the yoke 12d. As suggested above, the winding 22 corresponds to the conventional windings commonly used on two pole AC shaded pole motors. In the conventional motor, however, the yoke winding 22 is generally provided with a greater number of turns than shown in FIGS. 1-3 and the yoke winding 22 consumes or fills practically the entire rectangular space 20.

An important feature of the present invention is the use of secondary or auxiliary rotor encircling coil windings 24a, 24b which at least partially overlap the rotor space 16 and, therefore, at least partially encircles or receives a portion of the rotor 18. In the embodiment under discussion, two such auxiliary coils 24a, 24b are used, one on each side of the shaft 26 of the rotor 18.

In a typical construction, the rotor is fixed in position by conventional-type front and rear retainers 28, 30 each of which is provided with holes 36 aligned with holes 38 in the stator core 12 so that bolts 40 can pass through the holes 36 in the front retainer 28 and through the holes 38 in the stator core 12 to be received within threaded holes 41 in the rear retainer 30. Each of the retainers 28, 30 is provided with spacing portions 28a, 28b and 30a, 30b, respectively, to insure that the retainers clear the windings of the auxiliary coils 24a, 24b. Other methods for securing the rotor to the stator, known to those skilled in the art, may also be used.

Referring to FIG. 3, the motor 10 is shown provided with conventional shading coils 42, 44 mounted on the laminations 14 before the auxiliary coils 24a, 24b are mounted.

The cylindrical rotor space 16 defines two opposing poles which, in FIG. 3, have been shown as North pole 46 and South pole 48 for the purposes of illustration. With the poles, as shown, a portion of the magnetic flux or field $B_a$ extends directly across the rotor air space 16 and, therefore, will be coupled with the rotor 18. However, a portion of that magnetic field will be bypassed or shunted around the rotor air space. This fringe or leakage flux passing through the metal core is designated $B_m$, the flux $B_m$ serving no useful purpose or function since it bypasses the rotor 18. For this reason, the reluctance to such fringe or leakage fluxes should be maximized whenever possible. As mentioned in the Background of the Invention with respect to U.S. Pat. No. 4,482,832, it is common practice to provide connecting portions 50, 52 which have the smallest possible cross-sectional areas for bridging the opposing poles. Such small cross-sectional areas are typically minimized by providing recesses or notches 54, 56. The smaller the cross-sectional areas of the bridging portions 50, 52, the higher the reluctance to the fringe or leakage fields $B_m$. This, in turn, increases and maximizes the intensity of the direct fields $B_a$ bridging the rotor air space or air gap 16 and, therefore, linking with rotor 18.

Figure 4:
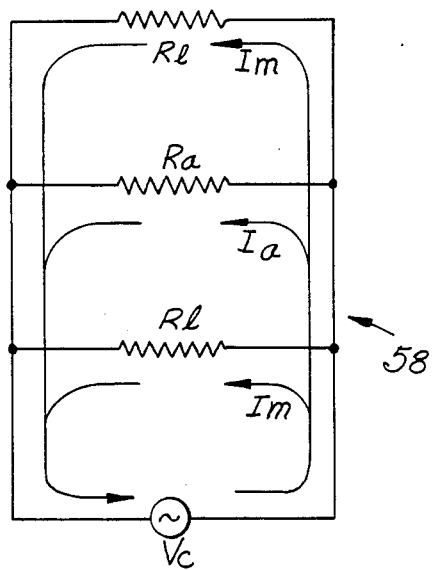
FIG. 4 is an equivalent magnetic circuit of a prior art motor similar to the one shown in FIGS. 1-3 suggesting the division of magnetic flux in a conventional motor which does not include auxiliary or secondary rotor encircling coil windings over the rotor air gap or space.

FIG. 4 is an equivalent electrical circuit 58 corresponding to the magnetic circuit of an electric motor in accordance with the prior art of the type disclosed in U.S. Pat. No. 4,482,832, or the motor 10 shown in FIGS. 1-3 absent the secondary or auxiliary rotor encircling coils 24a, 24b. The circuit 58 is a parallel circuit of resistor $R_a$ and two resistors $R_1$. The source $V_c$ represents the flux produced by the yoke winding 22 that flows in the magnetic circuit, which includes the stator core 12 and the rotor 18. The useful flux is represented by the current $I_a$ which corresponds to the flux $B_a$ in FIG. 3 which crosses the rotor air space 16 and couples to the rotor 18. However, currents $I_m$, part of the total current $I_T$ is shunted or bypassed through the low reluctance paths represented by the resistors $R_1$. The low reluctance paths in FIG. 3, for example, are the metallic portions 50 of reduced cross-sectional areas which connect or bridge the North and South poles 46, 48. The currents $I_m$ correspond, therefore, to the leakage or fringe flux fields $B_m$ in FIG. 3. As should be clear, the only flux which is effective or serves a useful function is the flux $B_a$ (corresponding to the current $I_a$). Thus, as in a parallel resistor circuit wherein the magnitude of a current in one resistor is reduced by shunting resistors, the leakage or fringe flux $B_m$ in FIG. 3 (equivalent to the shunted currents $I_m$) reduces the intensity of the primary flux field $B_a$ and, therefore, cause a deterioration of the operating parameters or characteristics of the motor.

Figure 5:
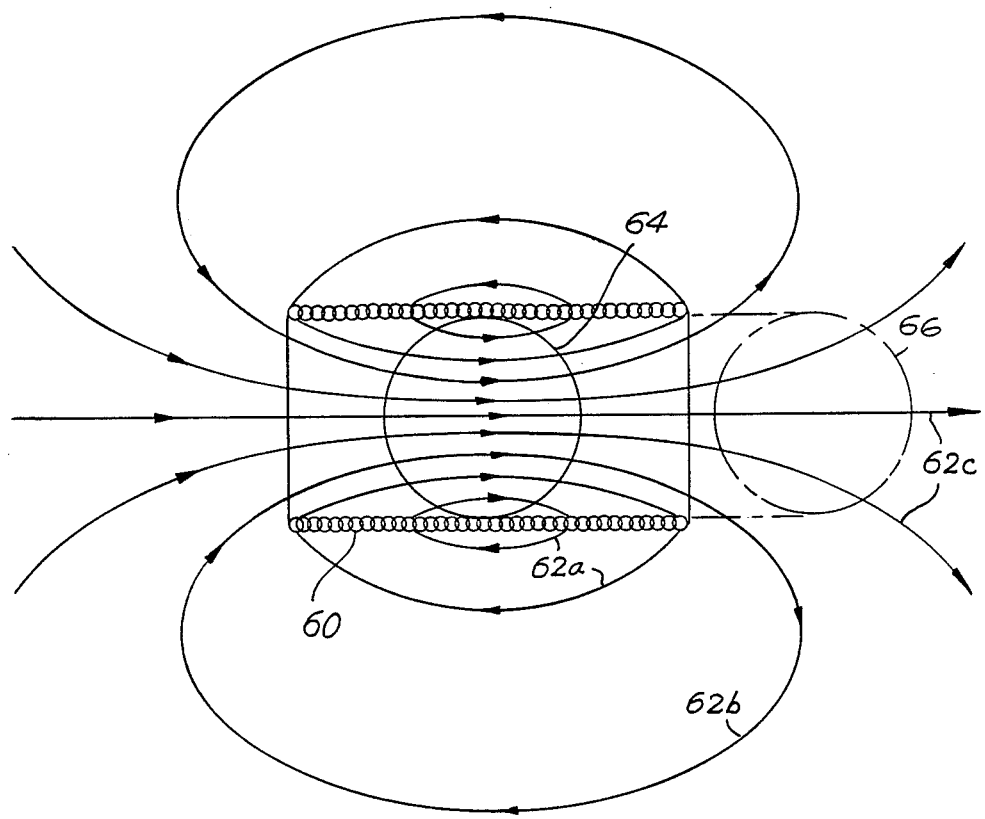
FIG. 5 is a schematic representation of a typical magnetic field created by a current flow through a coil, and the extent to which flux passes through an object positioned inside the coil (solid line) compared to the flux extending through an object along the axis of but outside the coil (dashed outline)

Referring to FIG. 5, there is shown a cross-sectional representation of a helical coil 60 through which a current is passed to create a magnetic field. The magnetic field created by such a coil is well known to those skilled in the art and includes lines of magnetic flux 62a-62c. As will be noted, while all of the lines of flux or magnetic field 62a-62c pass through the axially central portion of the coil, such lines increasingly diverge as the lines come closer to the axial ends of the coil. A cylindrical shape 64, representing a rotor, placed in the axially central portion of the coil, is shown to be coupled to all or most of the lines of magnetic field. However, when the same shaped and sized object 66, shown in dashed outline, is moved beyond the axial end of the coil 60, only some of the stronger magnetic field lines 62c still extend through the object. The remaining lines of magnetic field 62a and 62b bypass the object. The principle illustrated in FIG. 5 has been employed in the arrangement shown in FIGS. 1-3, wherein the secondary or auxiliary rotor encircling coils 24a, 24b are arranged over the cylindrical rotor space or air gap 16 and, therefore, overlap or enclose the rotor 18. Because of the configuration of the magnetic field, as shown in FIG. 5, all or most of the magnetic field created by the auxiliary rotor encircling coils 24a, 24b will, therefore, extend through the rotor 18 in the manner that the lines of magnetic field pass through the circular object 64 in FIG. 5.

Figure 6:
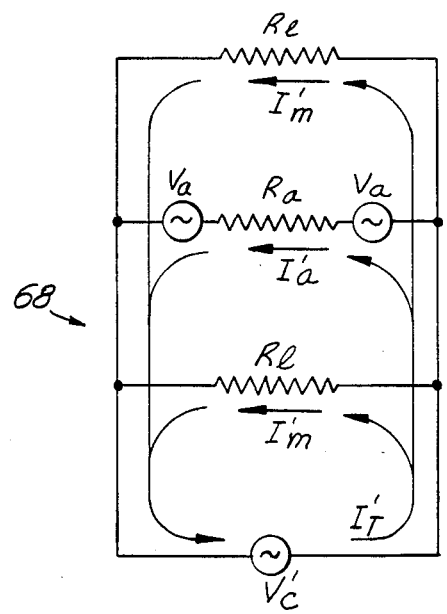
FIG. 6 is an equivalent magnetic circuit of the motor as shown in FIGS. 1-3, showing the effect of each of the three coils in the magnetic circuit.

The electrical analog or equivalent circuit of the motor 10 shown in FIGS. 1-3 with the two auxiliary rotor encircling coils 24a, 24b is the circuit 68 in FIG. 6. The two voltage sources $V_a$ correspond to each of the secondary or auxiliary rotor encircling coils 24a. It will be noted that each of these voltages $V_a$ are directly in series with $R_a$ which corresponds to the rotor space 16 or air gap 19. Since all of the lines of magnetic field produced by the auxiliary rotor encircling coils 24a, 24b will pass through the rotor space or air gap 16 and the rotor 18, as suggested in FIG. 5, this corresponds to the entire current $I_a'$ passing through the voltages $V_a$ passing through the resistor $R_a$. If the same number of total turns are to be maintained in the motor, there will be a channeling of the magnetic field into the rotor space 16 or air gap 19. If the number of turns in the yoke winding 22 is reduced to accommodate the auxiliary rotor encircling coils 24a, 24b in the rectangular opening or space 20, the voltage $V_c'$ in FIG. 6 will be less than the voltage $V_c$ in FIG. 4. While the currents $I_m'$ passing through the resistors $R_a$ are smaller, the total current $I_a'$ passing through the resistor $R_a$ is larger because that resistor is now in series with the two voltage sources $V_a$. Similarly, the total or overall flux passing through the rotor space 16 or air gap 19 and the rotor 18 will increase over the prior art construction which only utilized a yoke winding 22. The total current $I_T'$ may remain the same or change slightly, but this will not adversely affect the improved characteristics of the motor.

Figure 7:
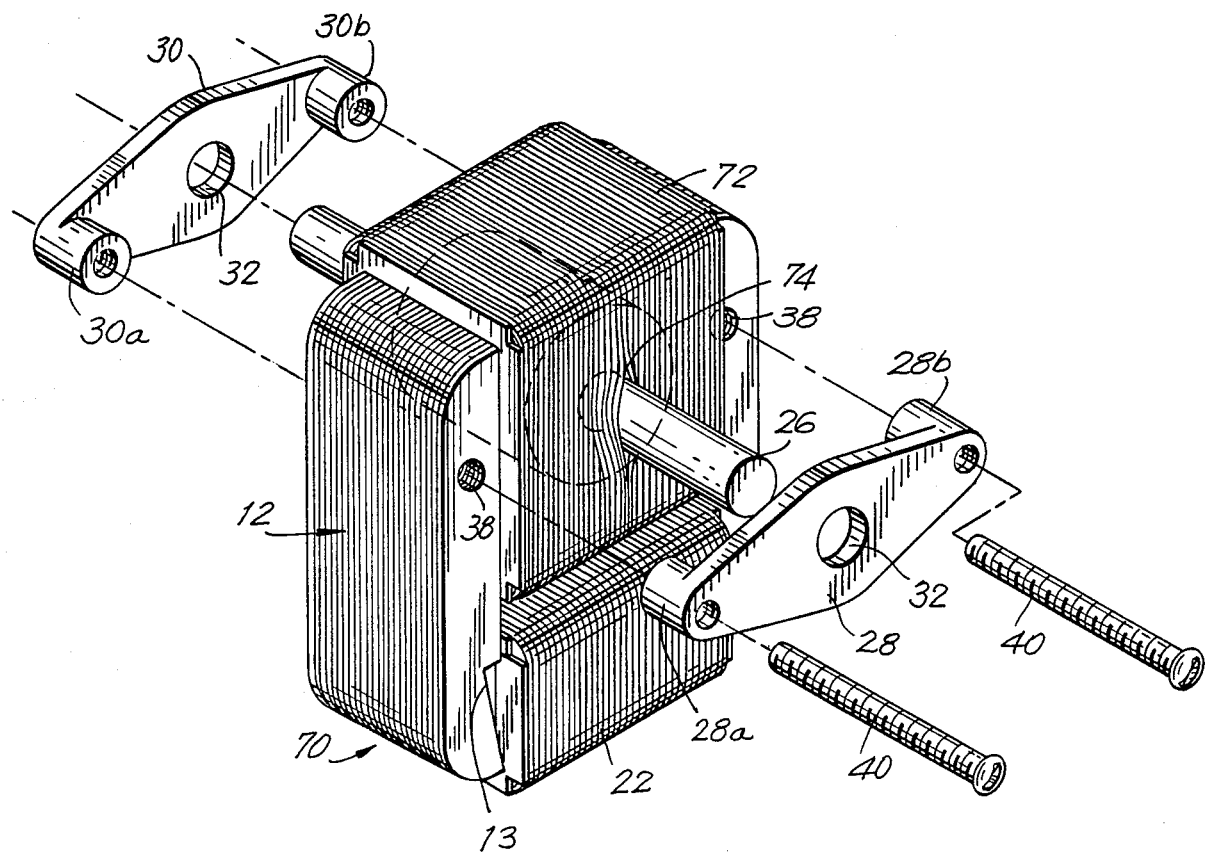
FIG. 7 is similar to FIG. 1, but showing an alternate embodiment wherein a single auxiliary or secondary rotor encircling coil is used in place of the two separate coils as shown in FIG. 1.
Figure 8:
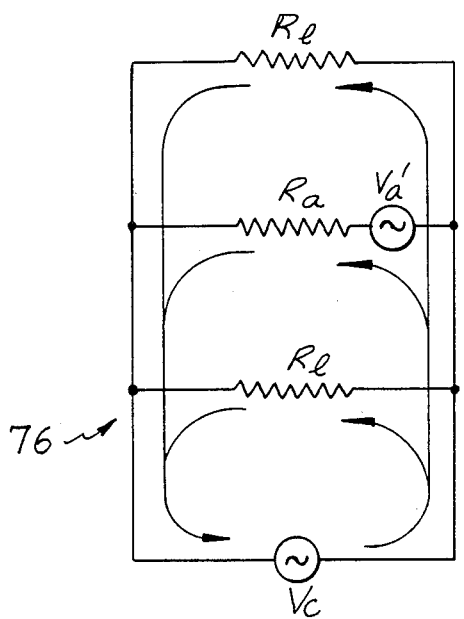
FIG. 8 is an equivalent magnetic circuit of the motor shown in FIG. 7, showing the effect of each of the two coils.

Referring to FIG. 7, another embodiment 70 of the invention is shown wherein only a single auxiliary rotor encircling coil or winding 72 is provided over the rotor space or air gap which encloses the rotor. In this embodiment, the turns of the coil 72 are wound on a rigid form extending on both sides of the shaft 26 with a separation or spacing 74 being provided between the turns to accommodate the shaft. In FIG. 8, the equivalent magnetic circuit 76 is shown for the motor 70 shown in FIG. 7. Here, only a single voltage source $V_a'$ is shown representing the entire coil on both sides of the shaft 26. If the number of turns are the same in the single coil 72 as the combined number of turns in windings in the auxiliary coils 24, 24a, 24b, the value of the source $V_a'$ should be approximately twice the value of the source $V_a$ in FIG. 6. The improvement and operation of the motor shown in FIG. 7 over the prior art motors is substantially the same as that discussed in connection with the motor 10 in FIGS. 1–3.

While each of the motors 10 and 70 include a primary or yoke winding 22, it should be clear that the present invention can also achieve many of its objects and advantages by simply utilizing the secondary or auxiliary rotor encircling coils 24, 24a, 24b and 72. If the yoke windings are eliminated, the voltages $V_c$ and $V_c'$ in the equivalent circuits shown in FIGS. 6 and 8 would be eliminated. While the rotor space 16 or air gap 19 and the rotor 18 would be deprived of a flux contribution from yoke windings 22, the secondary or auxiliary rotor encircling windings 24a, 24b and 72 could be enlarged since yoke winding would no longer occupy space in the rectangular space 20 and this would compensate for the absence of the yoke windings. In that event, the equivalent voltages $V_a$ and $V_a'$ will increase and all of the current passing therethrough would pass through the resistors $R_a$ which represent the rotor space of air gaps 19 and rotors 18.

Figure 9:
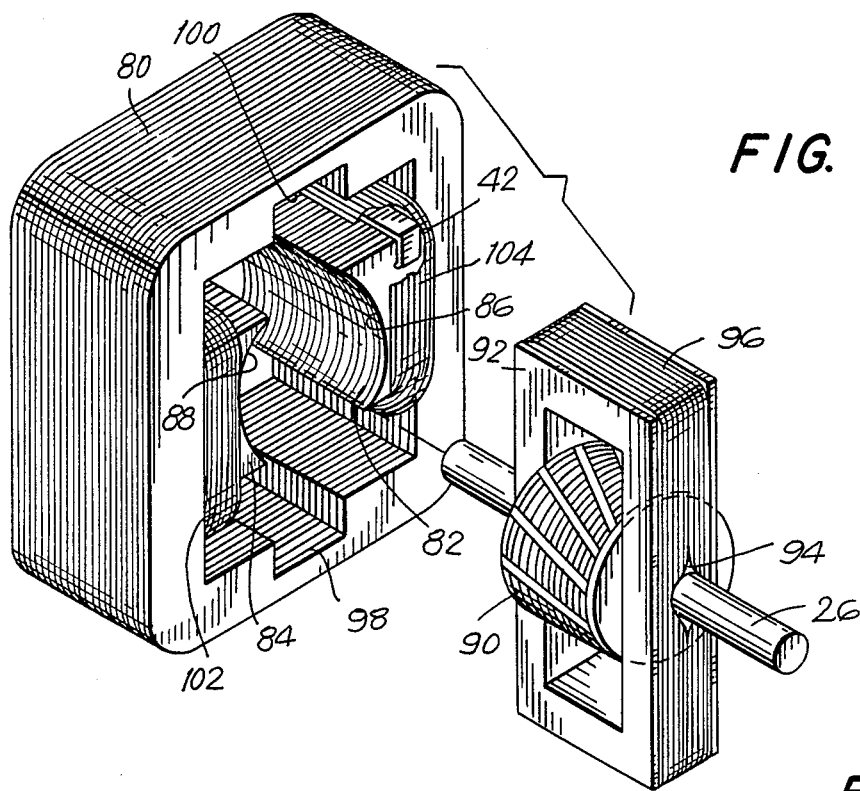
FIG. 9 is a still further embodiment of the present invention, wherein the secondary rotor encircling coil is wound on a rigid form which is placed between opposing poles and rotatably supports the rotor.
Figure 10:
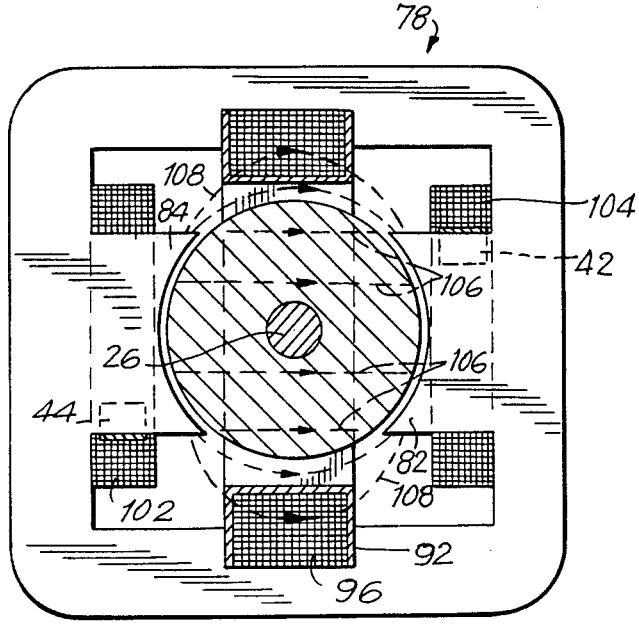
FIG. 10 is an enlarged front elevational view, partially in cross-section, of the motor shown in FIG. 9.

Referring to FIGS. 9 and 10, a still further embodiment of the motor in accordance with the invention is illustrated and identified by the reference numeral 78. The motor 78 includes a core 80 which is generally rectangular in shape and has two pairs of spaced substantially parallel legs, one pair of these legs supporting opposing poles 82, 84 having curved surfaces 86, 88 configured to receive a rotor 90 with small tolerance of air gap therebetween. The core 80 is similar to the core 12 discussed in connection with FIGS. 1–3 and 7 except that the laminations are continuous square sections and do not include a removable yoke 12d. In essence, the core 80 consists of two opposing poles 82, 84 which are connected by permanently connected or integral upper and lower yokes which form two essentially parallel magnetic circuits above and below the poles.

A support structure 92 is provided for rotatably supporting the shaft 26 and the rotor 90. The supporting structure 92 is shown to be a rectangular member having a generally U-shaped cross-section for receiving the windings or turns of the auxiliary rotor encircling coil, and being dimensioned to be frictionally received within lower and upper grooves or recesses 98, 100. Once the support structure 92 is press fitted within the slots 98, 100, the rotor 90 is centrally positioned between the poles 82, 84 and received within the auxiliary rotor encircling winding 96 to produce the effect shown in FIG. 5.

In the prior art constructions of motors similar to the motor 78, shown in FIGS. 9 and 10, coils 102 and 104 are provided on each of the poles 82, 84. However, these conventional coils are axially spaced from the rotor and there will, therefore, be lower and higher paths of magnetic reluctance for the field. Referring to FIG. 10, the magnetic field lines 106 are shown to extend from one pole to the opposite pole through the rotor space or air gap itself. This is the useful flux which couples to the rotor. However, because of the shape of the poles 82, 84, the portions of the poles which are the closest to each other are also those portions which are the furthest from the axis of the rotor. While a considerable amount of the magnetic field lines 106 will pass through and therefore couple to the rotor, a significant portion of the field lines 108 will bypass the rotor space or air gap.

Figure 11:
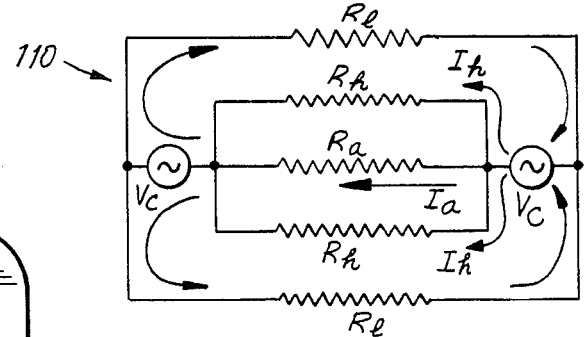
FIG. 11 is an equivalent magnetic circuit of a prior art construction of a motor similar to the one shown in FIG. 9, without the secondary or auxiliary rotor encircling coil.

In FIG. 11, an equivalent circuit 110 is shown which represents the magnetic circuit of a motor of the type shown in FIGS. 9 and 10, without the secondary or auxiliary rotor encircling winding 96. Here, the voltages $V_c$ correspond to the conventional pole windings 102, 104. The resistors $R_1$ represent the yokes connecting the poles, while the resistors $R_h$ represent the leakage flux which bypasses the rotor space or air gap. The currents developed by the voltage sources $V_c$ are divided or split between effective current $I_a$ (corresponding to field passing through the rotor air space) and leakage currents $I_h$ (corresponding to leakage or fringe flux fields).

Figure 12:
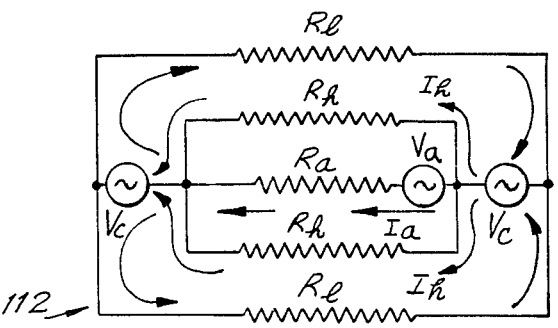
FIG. 12 is similar to FIG. 11, but showing the effect of the additional coil in the magnetic circuit of FIG. 11.

When the auxiliary rotor encircling winding 96 is incorporated, FIG. 12 shows the addition of a new voltage source $V_a$ which, again, is in series with the resistor $R_a$ which represents the effective or functional field passing through the rotor space or air gap. The total field circuit $I_a'$ flowing through the resistor $R_a$ in circuit 112 is now the composite or the sum of the initial current $I_a$ and the current produced by the additional sources $V_a$.

Figure 13:
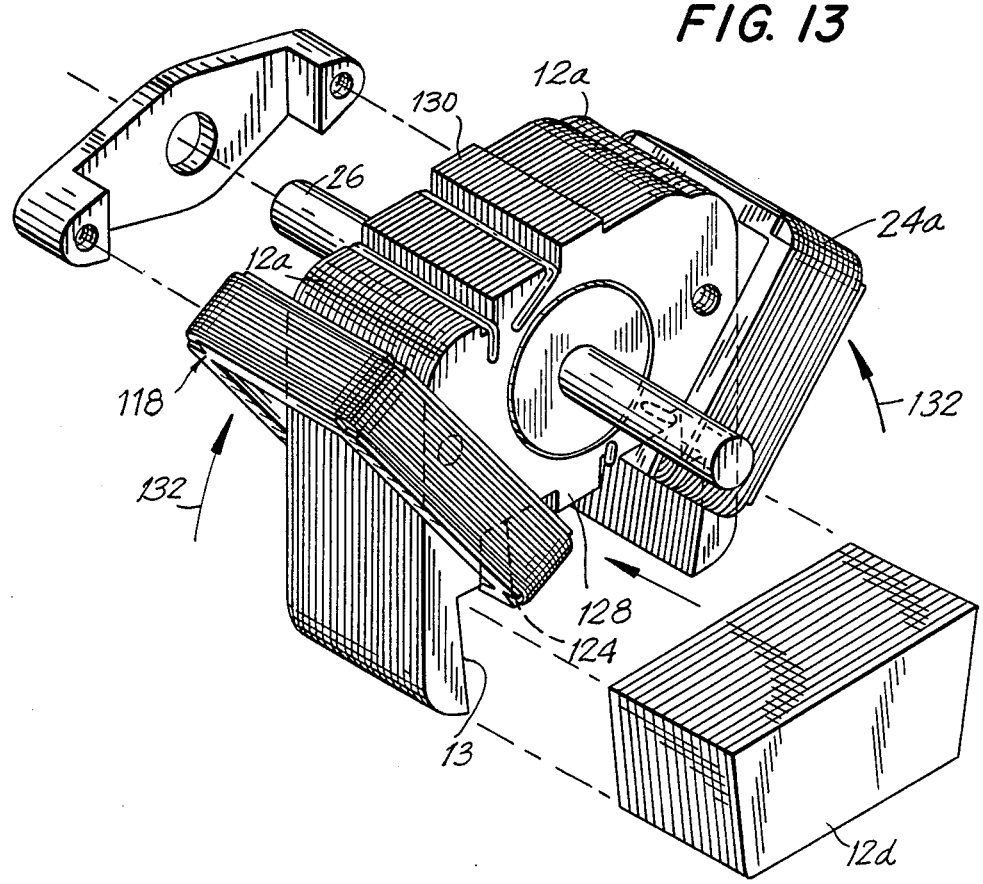
FIG. 13 is similar to FIG. 1, showing the manner in which the secondary or auxiliary rotor encircling coil forms may be mounted on the stator core.
Figure 14:
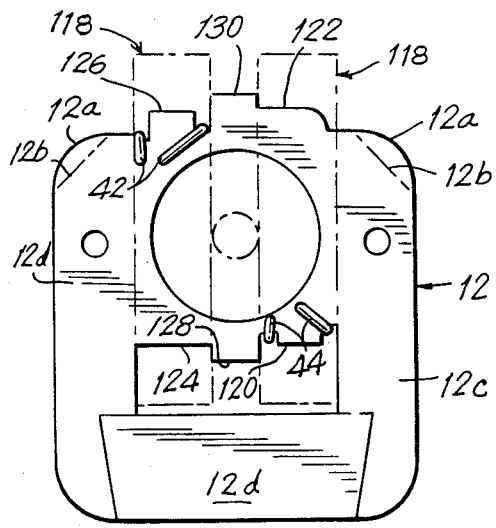
FIG. 14 shows the details of the geometry of the laminations forming the stator core shown in FIG. 13 which facilitates and makes possible the mounting of the secondary or auxiliary rotor encircling coils.
Figure 15:
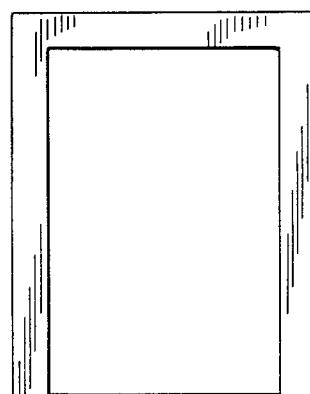
FIG. 15 is a front elevational view of a form suitable for receiving the wire which comprises the secondary or auxiliary rotor encircling coils shown in FIG. 13.
Figure 16:
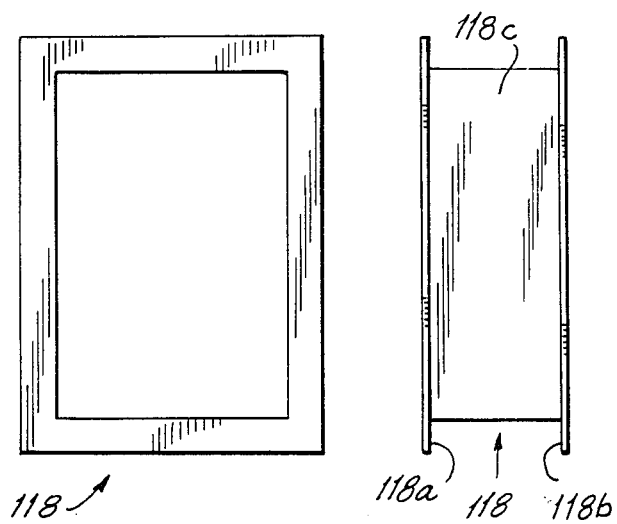
FIG. 16 is a side elevational view of the coil form shown in FIG. 15.

Referring to FIGS. 13 and 14, there is illustrated a geometrical configuration of the laminations which facilitates the mounting of the auxiliary rotor encircling windings 24a, 24b when wound on coil forms 118 of the type shown in FIGS. 15 and 16. The forms 118 include lateral flanges 118a, 118b connected to a flat rectangular form 118c (FIG. 16) to form a bobbin or spool. The windings or turns are wound on the form 118 as shown, for example, in FIG. 13.

The laminations are provided with surfaces 120, 122, on one side of the rotor axis and surfaces 124, 126 on the other side of the rotor axis, which associated surfaces being spaced from each other to substantially correspond to the inside dimension of the form 118 so that the form 118 frictionally engages the associated surfaces of the stator core as suggested by the dashed outlines in FIG. 14. Extension or protuberance 128 extends below the surfaces 122, 126, as viewed in FIG. 14, and serve as spacers for the forms 18 to limit their radially inward movements to thereby avoid contact or abutment against the rotating shaft 26.

Advantageously, the corner surfaces 12a are curved to allow the forms to clear the stator core during the mounting. To insure easier clearance, the corners 12a may be somewhat flattened as suggested by the dashed outlines 12b to increase the clearances and simplify assembly.

As will be noted, appropriate cutouts are provided proximate to the surfaces 120, 126 to permit the mounting of the shading coils 42, 44 below the surfaces 120, 126 to avoid interference with the mounting of the auxiliary or secondary rotor encircling coils 24a, 24b.

The method for mounting the auxiliary rotor encircling coils 24a, 24b is suggested in FIG. 13. Before the yoke 12d is mounted the rotor encircling coils 24a, 24b are slipped over the side portions or arms 12a, 12b as shown in FIG. 13. Once the lower portions of the coils have engaged the surfaces 120, 124 of the stator core, the turns are rotated as suggested by the arrows 132 until the upper portions of the coils engage and abut against the upper protuberance 130 of the stator core. Once the auxiliary rotor encircling coils are set in place, the yoke 12d, with or without a primary or yoke winding 22 is mounted by press fitting the yoke between the arms 12a, 12b (e.g. dove tail construction) to complete the magnetic circuit.

While the principle of operation of the invention has been described, together with the presently preferred embodiments for practicing the invention, it will be evident to those skilled in the art that various modifications or changes an be made while still achieving the advantages of the invention. Thus, for example, the rotor encircling coils may be connected in series or in parallel with each other and/or with the conventional yoke windings as long as the polarity of the sense of the windings are such that magnetic fields or flux lines reinforce each other instead of opposing or canceling each other. Additionally, while all of the embodiments have been described in relationship to motors having shaded poles, the rotor encircling coils in accordance with the invention can also be used in connection with any two pole electrodynamic machine including, but not limited to single and multiple phase machines, capacitor start motors and motors which use commutators.

A range of modifications and changes to the preferred embodiments described above will be apparent to those skilled in the art. For example, it is possible to use a single rotor encircling auxiliary coil, such as coil 24a or 24b. This would produce only a single voltage source $V_a$ in FIG. 6. Additionally, it is possible to utilize only auxiliary rotor encircling coils and, as suggested above, to do away totally with the yoke winding 22. This will, as suggested, normally result in higher voltage sources $V_a$ while eliminating the voltage sources $V_c$ in the equivalent circuits.

Figure 17:
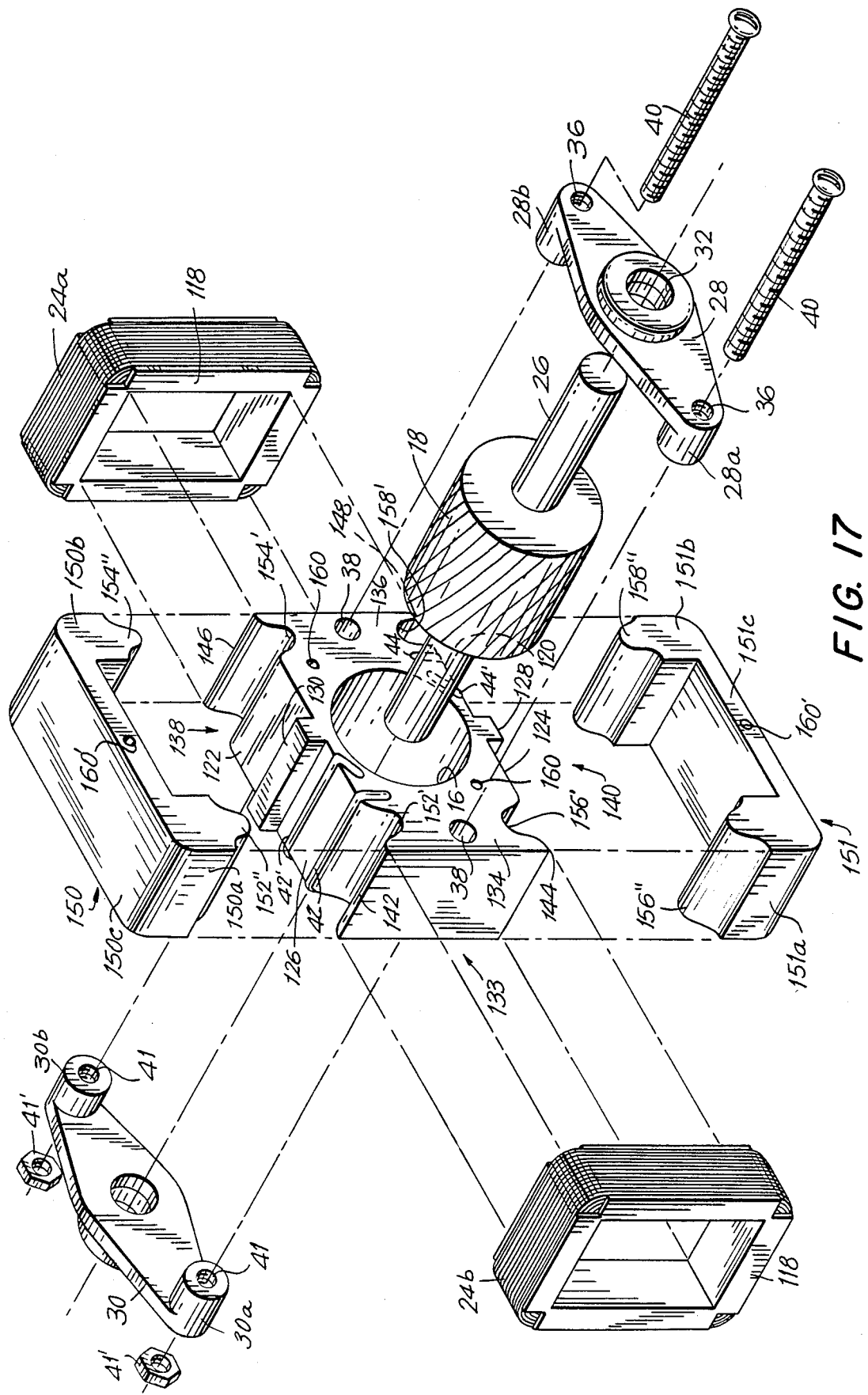
FIG. 17 is an exploded perspective view of another construction of the motor in accordance with the invention, which facilitates and speeds the assembly of the motor.
Figure 18:
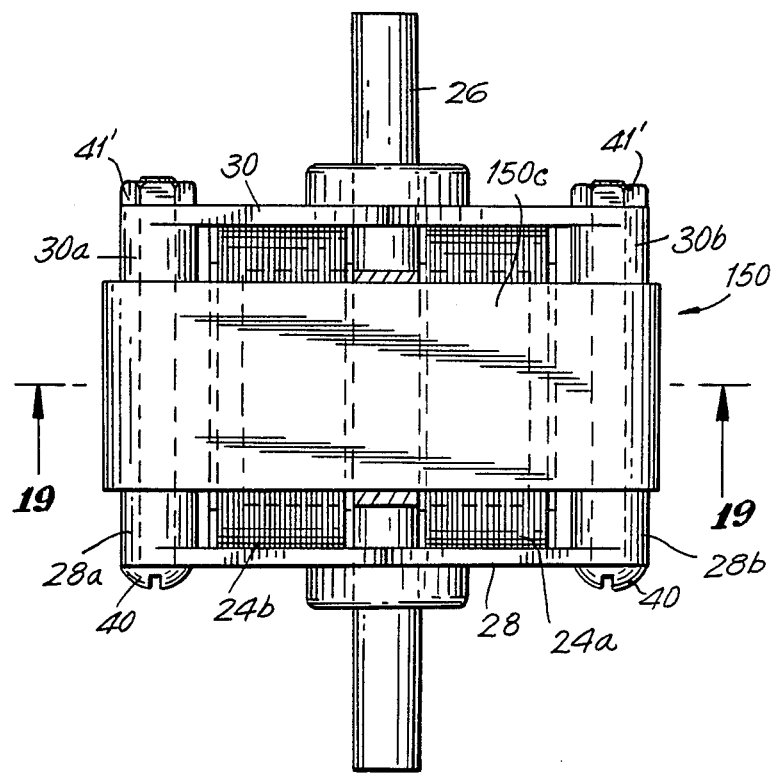
FIG. 18 is a top elevational view of the assembled motor shown in FIG. 17.
Figure 19:
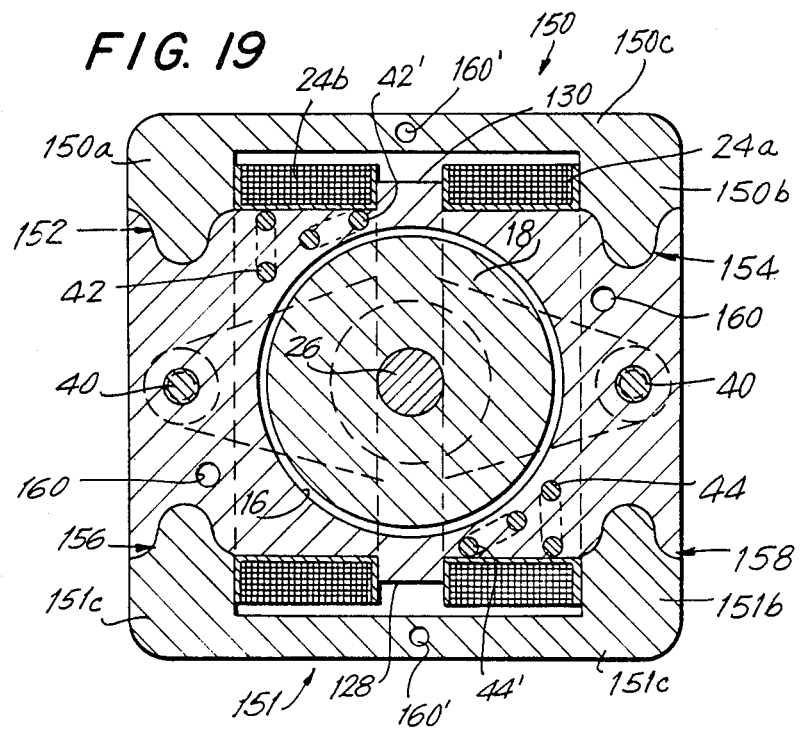
FIG. 19 is a front elevational view in cross-section of the motor shown in FIG. 18, taken along line 19—19.

Turning now to FIGS. 17–19, a construction is shown which substantially facilitates the assembly of a motor in accordance with the present invention, so that such assembly is more convenient and less costly.

The motor as shown in FIGS. 17–19 includes a main stator section 133 which includes lateral stator portions or sections 134 and 136, on each side of the rotor opening 16, respectively. The main stator section 133 also includes generally flat upper and lower stator surfaces generally designated by the reference numerals 138 and 140. The upper stator surface includes coil bearing surfaces 122 and 126, while the lower surface 140 includes coil bearing surfaces 120, 124 as previously described. Protuberances 128 and 130, which serve as coil positioning or aligning members, or as stop or movement limiting members, generally separate the adjacent coil bearing surfaces, as shown.

Between the outer edge 142 of the main stator section and the coil bearing surface 126, there is provided a generally elongate recess 152'. Similar recesses 154', 156' and 158' are provided at each of the corners of the main stator section adjacent respective coil bearing surfaces 122, 124 and 120.

U-shaped upper and lower yokes 150, 151, respectively, are provided which mate with the main stator section in the manner to be described. The U-shaped upper yoke 150 is provided with lateral arms or legs 150a and 150b, as well as intermediate or transverse connecting portion 150c. Dependent at the free end of the lateral arm or leg 150a is an elongate projection 152" which is configurated and dimensioned to be received within the elongated recess 152' with little or no tolerance or clearance. Similarly, elongate projections 154", 156" and 158" are configured and dimensioned to be received within associated elongated recesses 154', 156' and 158', respectively.

It will be noted that the elongate recesses and the associated elongate projections are substantially parallel to the motor axis. Preferably, the lateral yoke arms are received within the associated recesses in press fit relationship.

The yokes 150, 151, as well as the main stator section 133 would normally be formed of multiple laminations or plates and, therefore, there are also shown in FIGS. 17–19 rivets 160 which keep the plates of the main stator section together, and rivets 160' which keep the plates or laminations of the upper and lower yokes together, in a conventional or known manner.

In assembling the construction shown in FIGS. 17–18, the rotor 18 is first inserted through the cylindrical opening 16 of the main stator section 133. The stator coils 24a and 24b are slipped over the main stator section by positioning same over the associated bearing surfaces 120, 122, 124 and 126 and in abutment with the stops or projections 128, 130. The rotor is rotatably mounted on the main stator section by attaching the brackets or securing members 28, 30. Each of the U-shaped yokes 150, 151 is joined to the associated top and bottom stator surfaces 138, 140 to complete the magnetic circuit and to fix the positions of the stator coils 24a, 24b against movement and in at least partial axial overlapping relationship with the rotor 18. The step of joining the yokes to the main stator portion is preferably performed by press-fitting the elongate projections 152", 154", 156" and 158" into the associated elongate recesses 152', 154', 156' and 158'. However, other means of attachment may also be used for this purpose. However, the added advantage of press-fitting the yokes to the main stator section is that air gaps are minimized or eliminated, thereby reducing the reluctance of the magnetic circuit.

Figure 20:
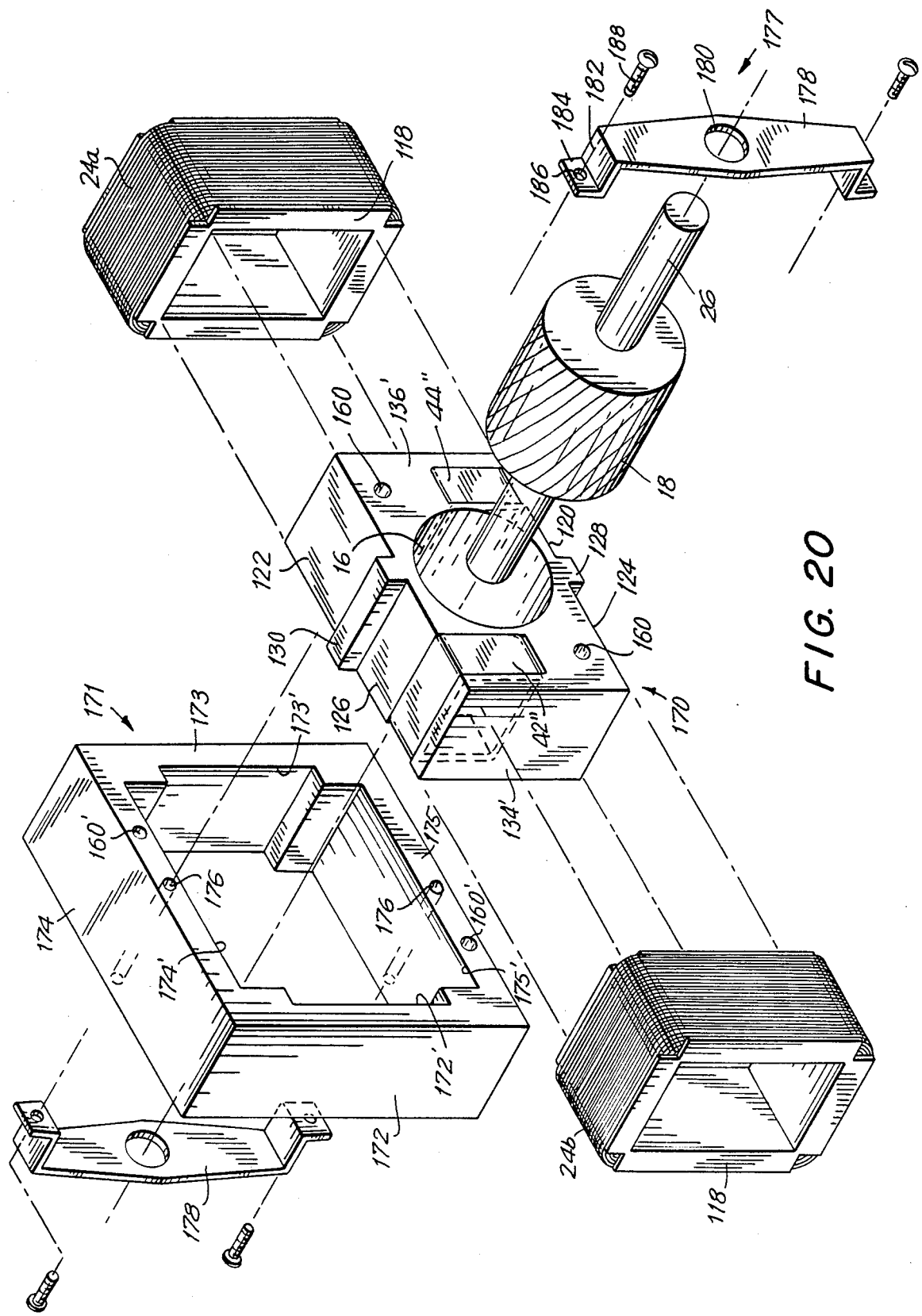
FIG. 20 is an exploded perspective view similar to FIG. 17 but showing another motor construction incorporating the present invention.
Figure 21:
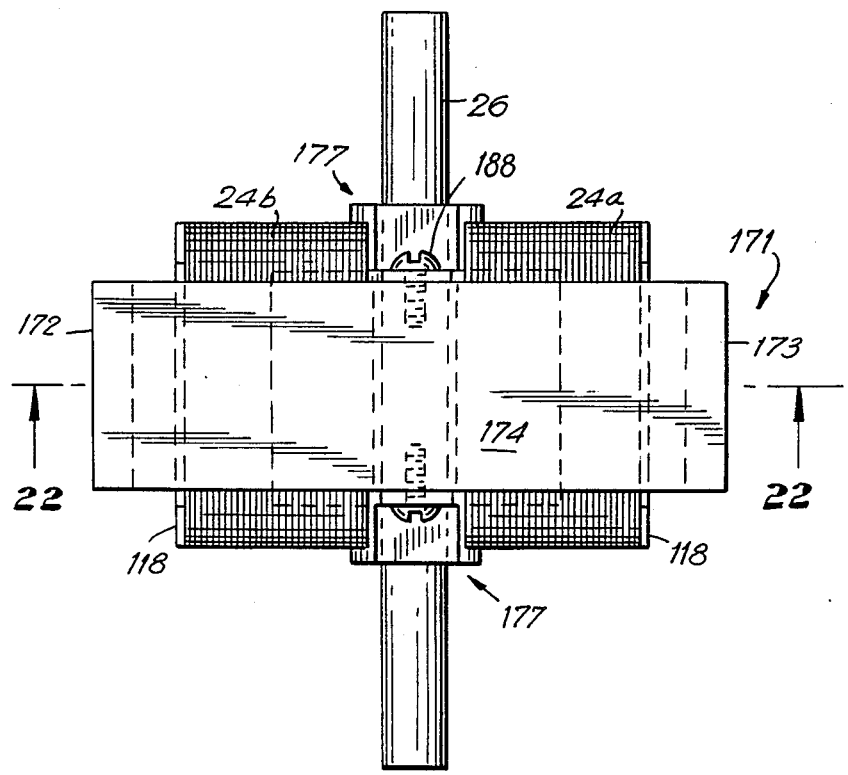
FIG. 21 is a top plan view of the assembled motor shown in FIG. 20.
Figure 22:
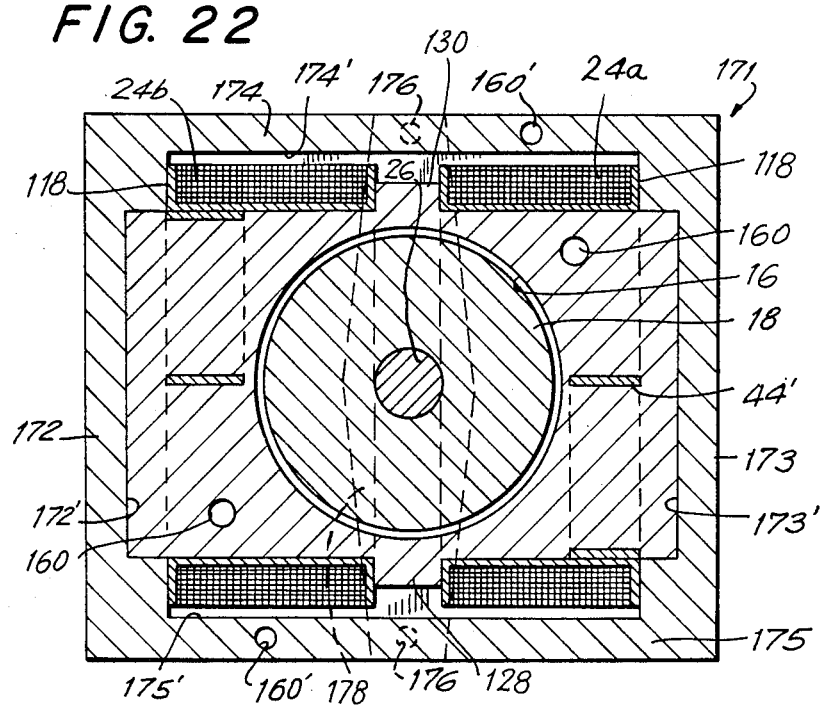
FIG. 22 is a cross-sectional front elevational view in cross-section of the motor shown in FIG. 21, taken along line 22—22.

A further embodiment which may easily and conveniently be assembled in accordance with the present invention is shown in FIGS. 20–22. Here, the main stator section is generally designated by the reference numeral 170 and defines lateral stator portions 134', 136' on opposite sides of the cylindrical opening 16, and generally flat top and bottom stator surfaces above and below the cylindrical opening which comprises surfaces 120, 122, 124 and 126. The stator windings 24a and 24b are provided each of which defines an opening configured and dimensioned to extend over the lateral stator portions 134' and 136' with clearance and move into abutment into the coil bearing surfaces 120, 122, 124 and 126. The same stop or limit projections 128, 130 are used for limiting movement of the stator coils from one side of the stator axis to the other side thereof, while aligning the stator coils with the rotor in overlapping relationship therewith.

A generally rectangular yoke 171 is provided which defines lateral yoke arms 172, 173 each provided with recesses 172' and 173' for receiving the lateral stator portion 134' and 136', respectively, and upper and lower yoke arms 174, 175 are provided with recesses 174', 175' for receiving the stator coils 24a, 24b and to maintain same on the coil bearing surfaces 120, 122 and 126 in overlapping relationship with the rotor.

In the embodiment of FIGS. 20–22, there are further provided brackets 177, 178 each of which includes a generally flat, central strip 178 provided with a central hole or opening 180 dimensioned to receive the shaft 26 of the rotor. Perpendicular or normal offset portions 182 are provided at the ends of which there are provided tabs 184 with holes 186. When assembled, the holes 186 become aligned with the holes 176 in the rectangular yoke 171, so that the brackets 177, 178 can be secured to the yoke by means of screws 186. Either threaded screws 188 may be used, in which case the holes 176 must themselves be threaded. Alternatively, as suggested in FIG. 17, for example, through bolts may be used which extend through all of the laminations and cooperate with a threaded member at the other end of the main stator section, such as nuts 41'.

As with the embodiment shown in FIGS. 17–19, the embodiment in FIGS. 20–22 is also advantageously constructed so that the lateral stator portions 134' and 136' are press-fitted into the recesses 172', 173' of the lateral yoke arms 172, 173.

While the invention has been disclosed with respect to specific embodiments, numerous alterations of the structure herein disclosed will be apparent to those ordinarily skilled in the art. The illustrated embodiments are only preferred embodiments of the invention which are given for purposes of illustration only and are not to be construed as a limitation of the invention as set forth in the claims.

What is claimed is:

1. A construction for a two-pole motor, comprising a main stator section provided with a central cylindrical opening; a rotor within said cylindrical opening mounted for rotation about a motor axis, said main stator section defining lateral stator portions on opposite sides of said cylindrical opening and generally flat top and bottom stator surfaces above and below said cylindrical opening, each of said top and bottom stator surfaces including a coil bearing surface generally coextensive with said cylindrical opening and yoke-abutting surfaces, on each side of said coil bearing surfaces, and generally coextensive with said lateral stator portions; stator windings defining an opening configured and dimensioned to extend over said lateral stator portions with clearance and moved into abutment against said coil bearing surfaces, said stator windings encircling said rotor; stop means on said coil bearing surfaces for limiting movement of said stator coils from one side of the motor axis to the other side thereof while aligning said stator coils axially with the rotor in overlapping relationship therewith; and generally U-shaped upper and lower yokes each having a pair of lateral yoke arms and a transverse yoke portion, said U-shaped yokes being dimensioned to maintain said stator coils on said coil bearing surfaces in overlapping relationship with said rotor.

2. A construction as defined in claim 1, wherein said stop means comprises a protuberance extending outwardly from each of said coil bearing surfaces.

3. A construction as defined in claim 1, wherein each yoke bearing surface is provided with an elongate recess substantially parallel to the motor axis, and said lateral yoke arms include elongate projections configured to be received within associated recesses in press fit relationship.

4. A construction as defined in claim 1, further comprising coil forms on which each stator winding is wound.

5. A construction as defined in claim 1, further comprising a shading coil on said main stator section.

6. A construction for a two-pole motor, comprising a main stator section provided with a central cylindrical opening; a rotor within said cylindrical opening mounted for rotation about a motor axis, said main stator section defining lateral stator portions on opposite sides of said cylindrical opening and generally parallel top and bottom stator surfaces above and below said cylindrical opening, each of said top and bottom stator surfaces including a coil bearing surface generally coextensive with said cylindrical opening; stator windings defining an opening configured and dimensioned to extend over said lateral stator portions with clearance and moved into abutment against said coil bearing surfaces, said stator windings encircling said rotor; stop means in the nature of protuberances proximate to said coil bearing surfaces for establishing a spacing between said stator windings to permit unobstructed rotation of said rotor shaft while aligning said stator windings with said rotor in overlapping relationship therewith; and a generally rectangular yoke defining lateral yoke arms provided with recesses for receiving said lateral stator portion and upper and lower yoke arms provided with recesses for receiving said stator winding and maintaining same on said coil bearing surfaces in overlapping relationship with said rotor.

7. A construction means as defined in claim 5, further comprising coil forms in which each stator winding is wound.

8. A construction means as defined in claim 5, wherein said lateral stator portions are received within said recesses of said lateral yoke arms in press-fitted relationship.

* * * * *